United States Patent [19]

Takato

[11] Patent Number: 5,636,065
[45] Date of Patent: Jun. 3, 1997

[54] TRIPLET LENS SYSTEM

[75] Inventor: Hideyasu Takato, Hachioji, Japan

[73] Assignee: Olympus Optical Co., Ltd., Tokyo, Japan

[21] Appl. No.: 355,685

[22] Filed: Dec. 14, 1994

[30] Foreign Application Priority Data

Dec. 16, 1993 [JP] Japan .................. 5-342792

[51] Int. Cl.$^6$ ........................ G02B 3/02
[52] U.S. Cl. ........................ 359/716; 359/785
[58] Field of Search ................ 359/644, 645, 359/661, 784, 738, 785, 797, 786, 787, 788, 708, 716

[56] References Cited

U.S. PATENT DOCUMENTS

| | | | |
|---|---|---|---|
| 4,542,961 | 9/1985 | Sato | 350/475 |
| 4,676,607 | 6/1987 | Wakamiya | 359/788 |
| 5,204,780 | 4/1993 | Sakamoto | 359/690 |
| 5,546,236 | 8/1996 | Ogata et al. | 359/794 |

FOREIGN PATENT DOCUMENTS

| | | | |
|---|---|---|---|
| 59-34510 | 2/1984 | Japan . | |
| 59-160119 | 9/1984 | Japan . | |
| 59-160120 | 9/1984 | Japan | 359/785 |
| 63-96620 | 4/1988 | Japan . | |

*Primary Examiner*—Georgia Y. Epps
*Assistant Examiner*—Dawn-Marie Bey
*Attorney, Agent, or Firm*—Cushman, Darby & Cushman, IP Group of Pillsbury Madison & Sutro, LLP

[57] ABSTRACT

A triplet lens system comprising, in order from the object side, a first positive meniscus lens component having a convex surface on the object side, a second biconcave lens component, a third biconvex lens component and a stop; and configured so as to correct aspherical aberration and coma at the same time by using at least one aspherical surface on the second and the third lens components.

4 Claims, 6 Drawing Sheets

FIG. IA
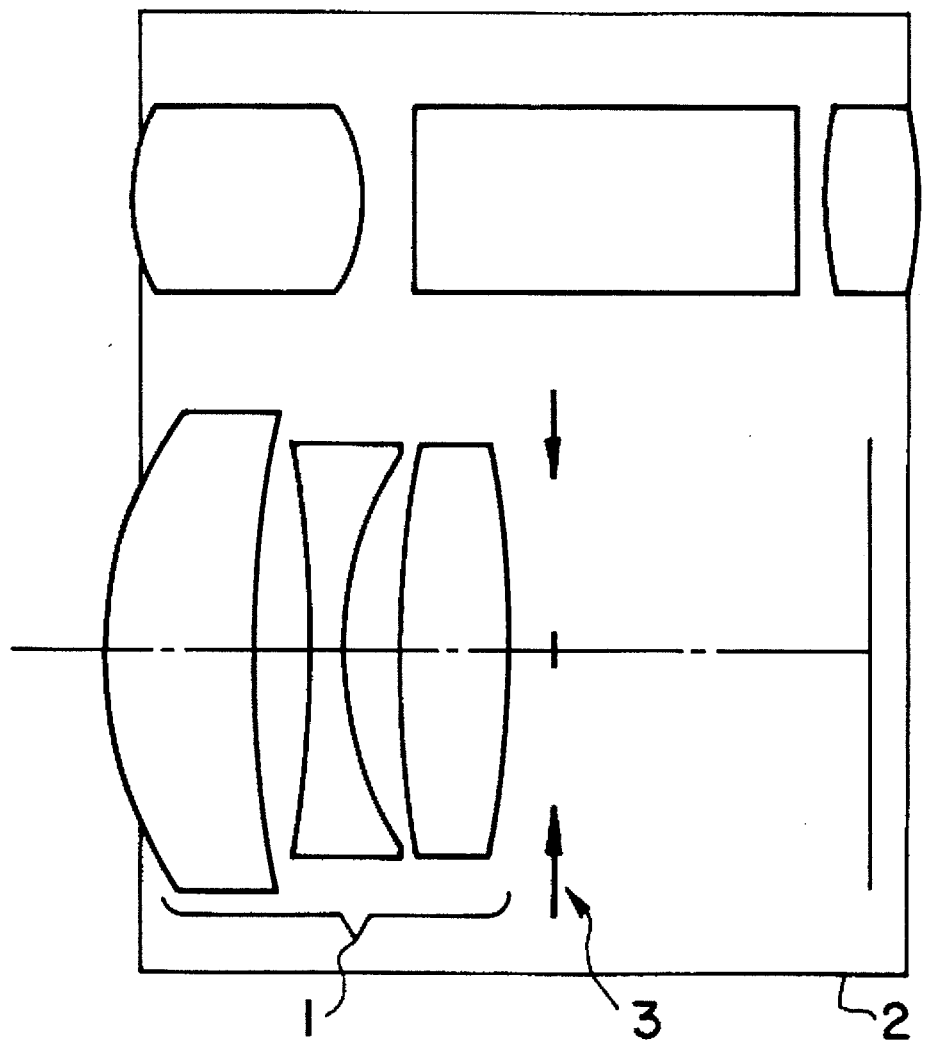

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

FIG. 4A
SPHERICAL ABERRATION
FIG. 4B
ASTIGMATISM
FIG. 4C
DISTORTION
FIG. 4D
LATERAL CHROMATIC ABERRATION
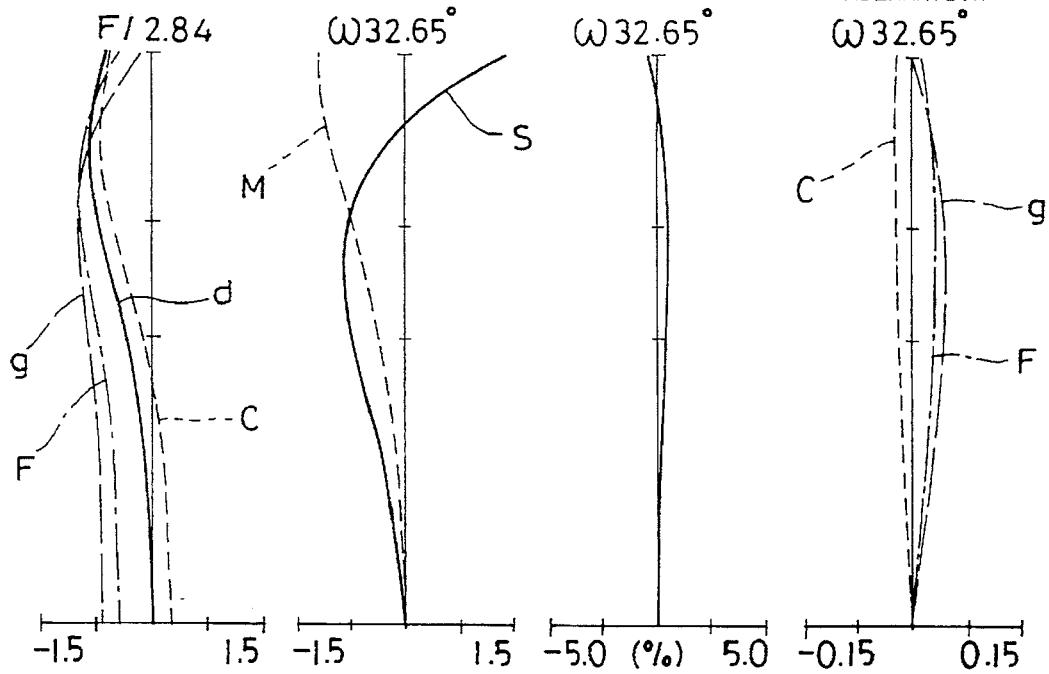
FIG. 5A
SPHERICAL ABERRATION
FIG. 5B
ASTIGMATISM
FIG. 5C
DISTORTION
FIG. 5D
LATERAL CHROMATIC ABERRATION
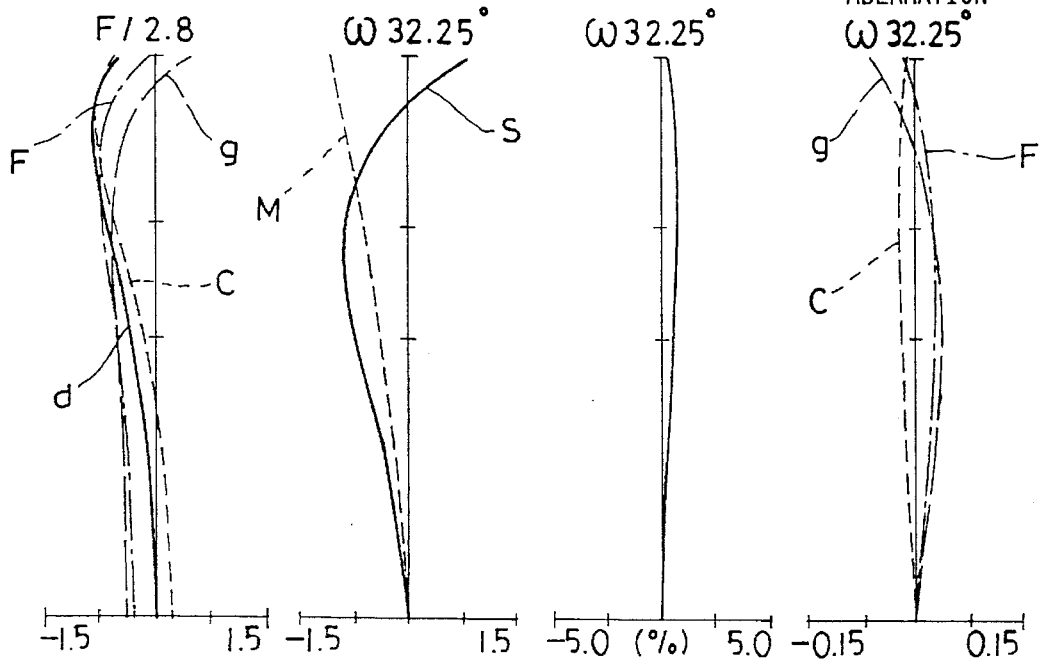

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

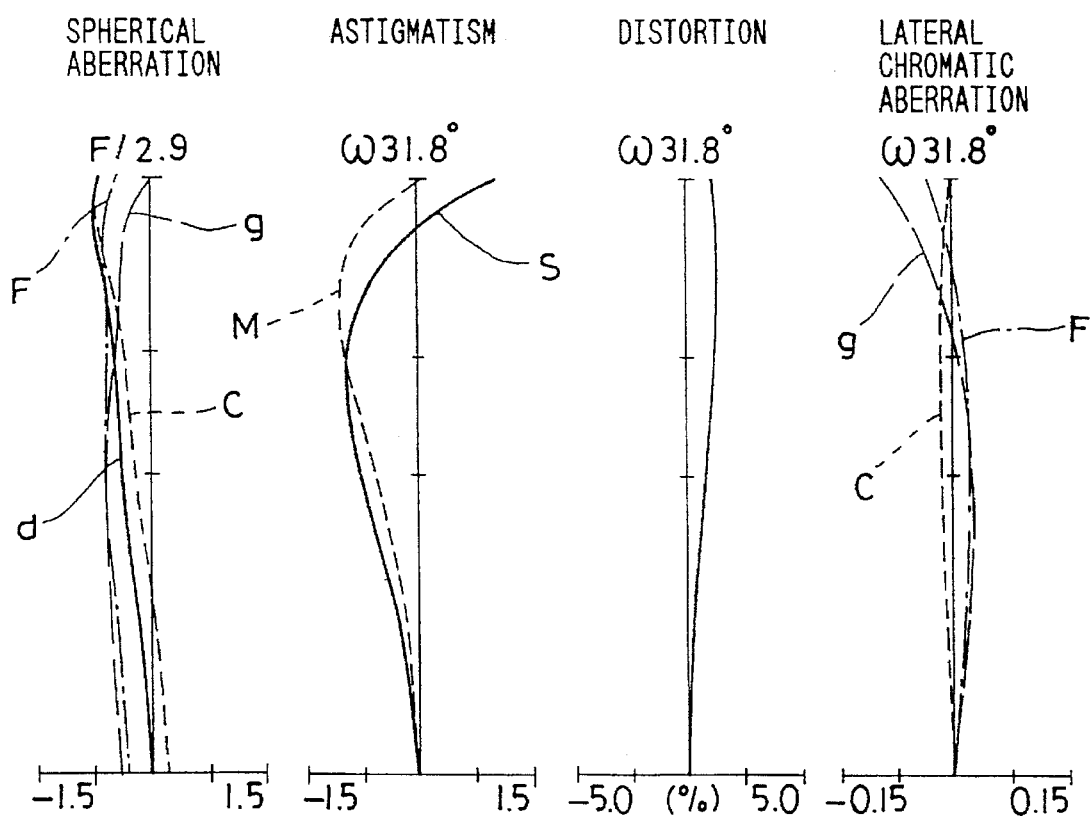

TRIPLET LENS SYSTEM

BACKGROUND OF THE INVENTION a) Field of the invention

The present invention, as can be best viewed in FIG. 1A, relates to a triplet lens system 1 which is suited for use with lens shutter cameras 2, etc., and has a stop 3 disposed on the image side of the lens system.

b) Description of the prior art

A large number of lens shutter cameras have conventionally adopted triplet lens systems owing to a fact that each of these lens systems can have favorable optical performance by using a small number of lens components and can easily be configured compact by.

Most of the conventional examples of the triplet lens systems belong to lens systems which have stops disposed after the lens systems since these lens systems are compatible with lens barrels having simple structures and advantageous not only for moving lens components, but also for exposure control.

For the triplet lens systems, each of which is composed of a small number of lens components and has low design freedom, however, there is a certain limit in configuring a photographic lens system which is composed only of spherical lens components, and has a wide field angle, a large aperture, a compact size and high optical performance. In particular, the triplet lens system which is composed only of the spherical lens components allows the optical performance thereof to be remarkably degraded, or produces coma flare and aggravates spherical aberration at the same time at intermediate and marginal angles within a range of a field angle thereof.

As conventional examples of the triplet lens systems which use aspherical lens components for solving these problems, there are known the lens systems disclosed by Japanese Patents Kokai Publication No. Sho 59-34,510, Kokai Publication No. Sho 59-160,119, Kokai Publication No. Sho 59-160,120 and Kokai Publication No. Sho 63-96,620.

The triplet lens systems disclosed by these patents have relatively large apertures, wide field angles, compact compositions and favorable optical performance which are obtained by using the aspherical lens components. However, these photographic lens systems have F numbers on the order of 3.5 and cannot be said to be sufficient in brightness thereof.

Further, the triplet lens systems disclosed by Japanese Patents Kokai Publication No. Sho 59-160,119, Kokai Publication No. Sho 59-160,120 and Kokai Publication No. Sho 63-96,620, out of the above-mentioned conventional examples, select small departures from the reference sphere of the aspherical surfaces, thereby having insufficient functions to correct aberrations, or undercorrecting coma.

Furthermore, the triplet photographic lens systems disclosed by Japanese Patent Kokai Publication No. Sho 59-34,510 uses an aspherical surface on a first lens component thereof. However, such an aspherical surface used on the first lens component remarkably undercorrects spherical aberration though it has a function to correct coma, whereby the triplet lens system allows spherical aberration to be remarkably produced on the negative side.

SUMMARY OF THE INVENTION

A primary object of the present invention is to provide a triplet lens system which comprises three lens components of three lens elements using an aspherical surface, or aspherical surfaces, and has a wide field angle, a large aperture and a compact size.

The triplet lens system according to the present invention comprises, in order from the object side, a first positive meniscus lens component having a convex surface on the object side, a second biconcave lens component, a third biconvex lens component and a stop, uses at least one aspherical surface on the second lens component and the third lens component, and is configured so as to satisfy the following conditions (1) and (2):

$$1\times10^{-5} < |x_1/f| < 1\times10^{-2} \quad (1)$$

$$0.5 < r_5/f < 1.1 \quad (2)$$

wherein the reference symbol $x_1$ represents a departure from a reference sphere of at least one of the aspherical surfaces as measured at a maximum effective diameter thereof, the reference symbol $r_5$ designates a radius of curvature on an object side surface of the third lens component and the reference symbol f denotes a focal length of the triplet lens system as a whole.

When an attempt is made to configure a triplet lens system so as to have an F number on the order of 2.8, it is general that an axial marginal ray is enhanced and rays passing through portions in the vicinities of margins of lens components are strongly refracted, whereby remarkable spherical aberration is produced. When an additional attempt is made to configure the triplet lens system so as to be compact by shortening a total length thereof, the lens components have strengthened refractive powers and produce coma, thereby degrading image qualities on marginal portions of an image surface of the triplet lens system.

On the other hand, an aspherical lens component has a high function at a marginal portion thereof, and serves for correcting the axial marginal ray and off-axial rays which have large heights.

The triplet lens system according to the present invention is configured so as to correct spherical aberration and coma at the same time which conventionally posed the problems. For correcting these aberrations at the same time by using an aspherical surface or surfaces, it is effective to dispose the aspherical surface or surfaces as a third surface and/or subsequent surfaces. When an aspherical surface is disposed as a first or second surface, the off-axial rays pass through a marginal portion of a lens component having the aspherical surface, whereby the function of the aspherical surface is effective only for the off-axial rays and the aspherical surface cannot correct spherical aberration. When an aspherical surface is used as a third surface or a subsequent surface, in contrast, the function of the aspherical surface is favorably distributed between the axial ray and the marginal rays, thereby making it possible to configure a photographic lens system which is capable of correcting both spherical aberration and coma, or has high optical performance.

For this reason, the triplet lens system according to the present invention uses an aspherical surface or aspherical surfaces as one or some of surfaces of the second lens component and the third lens component. At least one of these aspherical surfaces is configured so as to satisfy the above-mentioned condition (1) so that the function of the aspherical surface will be maximum. In other words, so far as at least one of the aspherical surfaces has a departure from a reference sphere thereof which is within the range defined by the condition (1), it is possible to obtain the maximum effect of the function of the aspherical surface, or correct spherical aberration and coma favorably. Since a lens system which is of the triplet type like the lens system according to the present invention and is bright, or has an F number on the order of 2.8, cannot be composed only of spherical lens component, it is necessary to use an aspherical surface or aspherical surfaces to compose such a lens system and the condition (1) need be satisfied for favorably correcting spherical aberration and coma. If the condition (1) is not satisfied, it will be impossible to correct coma. If the lower limit of $1\times10^{-5}$ of the condition (1) is exceeded, coma will be undercorrected. If the upper limit of $1\times10^{-2}$ of the condition (1) is exceeded, aberrations of high orders will be produced. Speaking of spherical aberration, it will be undercorrected if the lower limit of the condition (1) is exceeded or overcorrected if the upper limit of the condition (1) is exceeded.

By the way, it is more desirable to modify the condition (1) so as to have a lower limit of $1\times10^{-4}$.

Further, the triplet lens system according to the present invention is configured so as to satisfy the condition (2) for maintaining coma at a favorable level. The condition (2) defines a radius of curvature for an object side surface of the third lens component. So far as $r_5/f$ is within the range not exceeding the upper limit of the condition (2), the third lens component can have a certain degree of refractive power, whereby the triplet lens system can have a short back focal length or a short total length. If $r_5/f$ exceeds the lower limit of 0.5 of the condition (2), the object side surface of the third lens component will strongly refracts rays, thereby remarkably curving coma. By the way, it is more desirable to modify the condition (2) so as to have an upper limit of 1.0.

In the next place, it is desirable to configure the triplet lens system according to the present invention so as to satisfy the following conditions (3) and (4):

$$0.5 < f_1/f < 0.95 \qquad (3)$$

$$-3.5 < f_{12}/f < -0.8 \qquad (4)$$

wherein the reference symbol $f_1$ represents a focal length of the first lens component, and the reference symbol $f_{12}$ designates a total focal length of the first lens component and the second lens component.

The condition (3) defines a refractive power for the first lens component, whereas the condition (4) defines a total refractive power for the first lens component and the second lens component. Since it is possible to suppress Petzval's sum at a small level and maintain good flatness of an image surface by distributing refractive powers adequately between the first lens component and the second lens component as defined above, it is desirable to configure the triplet lens system so as to satisfy the conditions (3) and (4).

The condition (3) is required for correcting mainly spherical aberration and astigmatism. If the lower limit of 0.5 of the condition (3) is exceeded, spherical aberration will be tilted on the negative side and barrel form distortion will be produced in a large amount. In this case, a sagittal image surface and a meridional image surface will be remarkably tilted on the positive side, and astigmatic difference will be increased. If the upper limit of 0.95 of the condition (3) is exceeded, spherical aberration will be overcorrected.

The condition (4) is required for maintaining Petzval's sum at an adequate value and reducing astigmatism. If the lower limit of -3.5 of the condition (4) is exceeded, Patzvel's sum will have a large positive value, thereby making it impossible to suppress curvature of field. If the upper limit of -0.8 of the condition (4) is exceeded, Petzval's sum will have a small value and the sagittal image surface will be overcorrected but, at high orders, the meridional image surface will be remarkably tilted on the negative side, whereby astigmatic difference will be enlarged and can hardly be corrected.

For correcting spherical aberration and coma more favorably, it is desirable to configure the triplet lens system according to the present invention so as to satisfy the following condition (5):

$$1\times10^{-6} < |x_2/f| < 1\times10^{-3} \qquad (5)$$

wherein the reference symbol $x_2$ represents a departure from the reference sphere of the aspherical surface as measured at a point located at ½ of the maximum effective diameter thereof.

For correcting spherical aberration and coma much more favorably, it is desirable that the aspherical surface satisfies the condition (1) and the above-mentioned condition (5) at the same time. Speaking concretely, the condition (5) has an effect similar to that of the condition (1), or spherical aberration and coma can be corrected favorably so far as $x_2$ is within the range defined by the condition (5).

BRIEF DESCRIPTION OF THE DRAWINGS

FIG. 1A shows triplet lens system 1, lens shutter camera 2, and stop 3.

FIG. 4A, FIG. 4B, FIG. 4C and FIG. 4D show curves visualizing aberration characteristics of a third embodiment of the present invention;

FIG. 5A, FIG. 5B, FIG. 5C and FIG. 5D show curves visualizing aberration characteristics of a fourth embodiment of the present invention;

FIG. 8A, FIG. 8B, FIG. 8C and FIG. 8D show graphs illustrating aberration characteristics of a seventh embodiment of the present invention.

DETAILED DESCRIPTION OF THE PREFERRED EMBODIMENTS

Figure 1B:
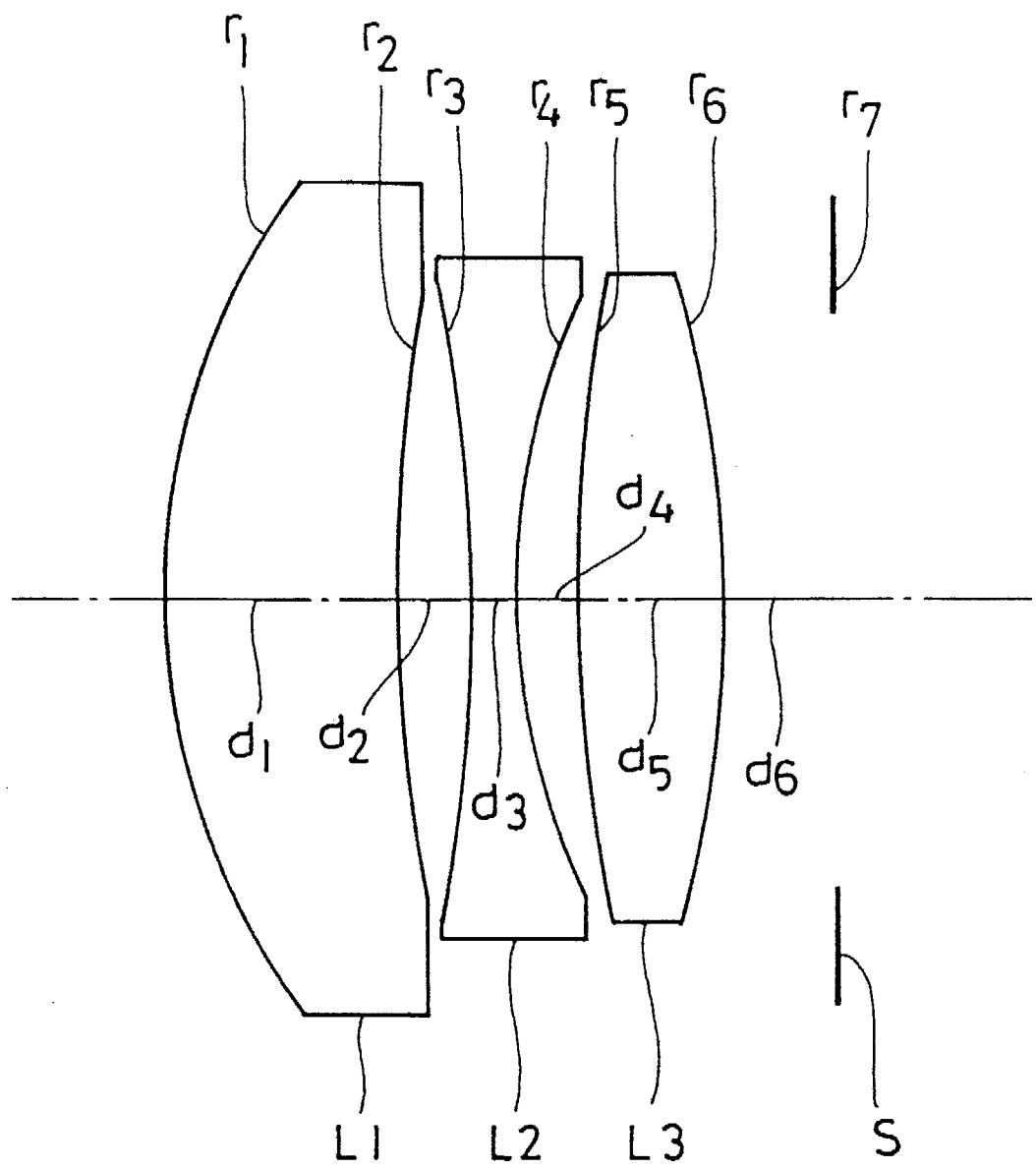
FIG. 1B shows a sectional view illustrating a composition of the triplet lens system according to the present invention.
Figure 2A:
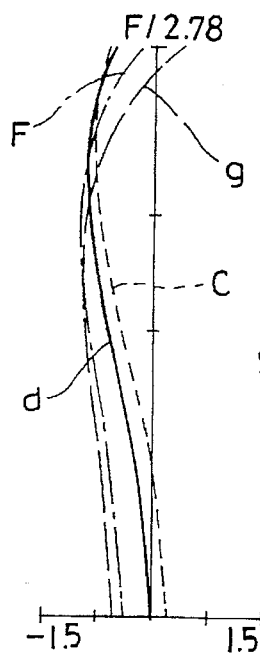
FIG. 2A, FIG. 2B, FIG. 2C and FIG. 2D show graphs illustrating aberration characteristics of a first embodiment of the triplet lens system according to the present invention.
Figure 2B:
Figure 2C:
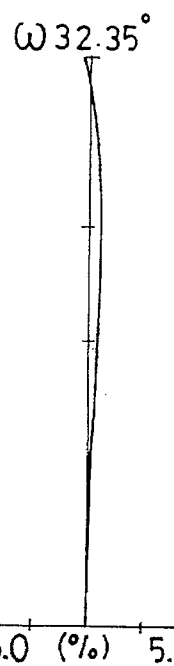
Figure 2D:
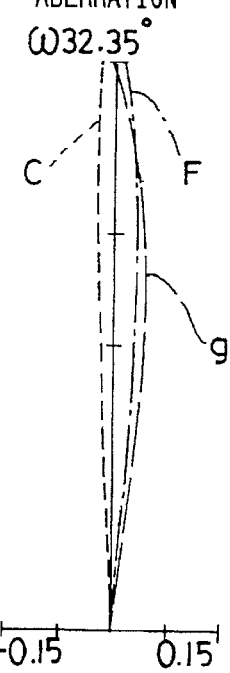
Figure 3A:
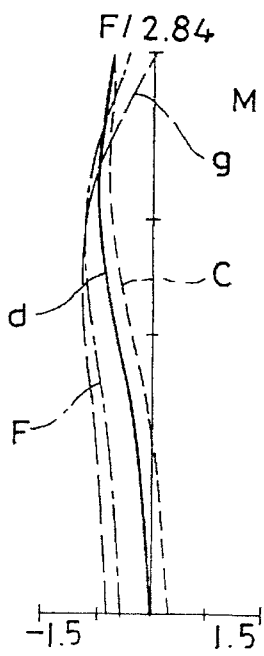
FIG. 3A, FIG. 3B, FIG. 3C and FIG. 3D show graphs illustrating aberration characteristics of a second embodiment of the present invention.
Figure 3B:
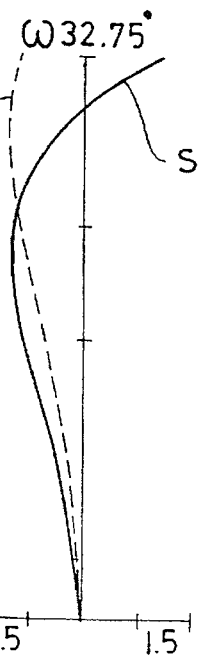
Figure 3C:
Figure 3D:
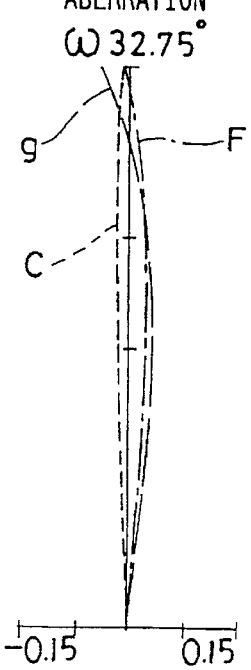
Figure 6A:
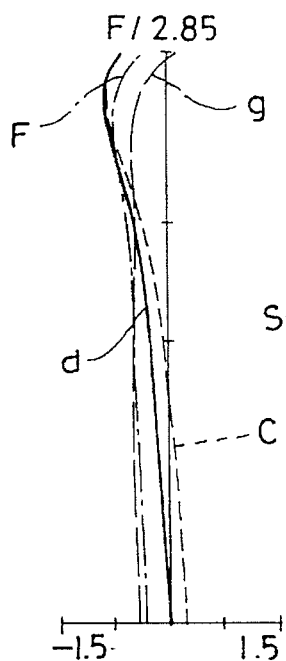
FIG. 6A, FIG. 6B, FIG. 6C and FIG. 6D show curves visualizing aberration characteristics of a fifth embodiment of the present invention.
Figure 6B:
Figure 6C:
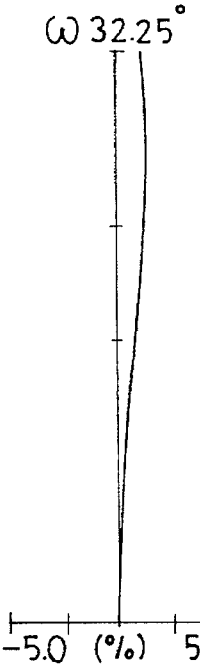
Figure 6D:
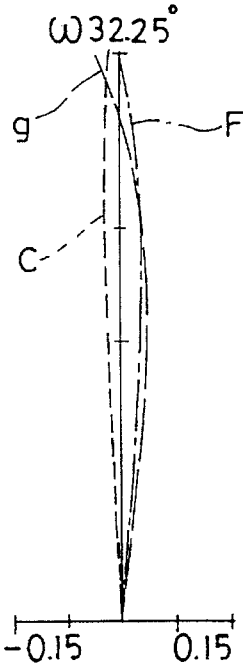
Figure 7A:
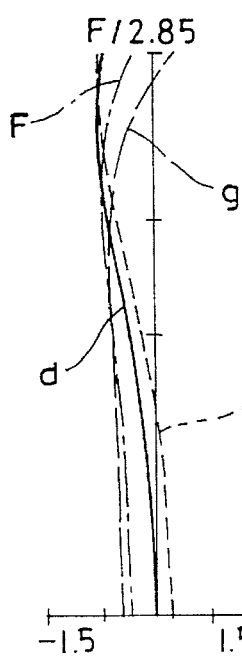
FIG. 7A, FIG. 7B, FIG. 7C and FIG. 7D show graphs illustrating aberration characteristics of a sixth embodiment of the present invention.
Figure 7B:
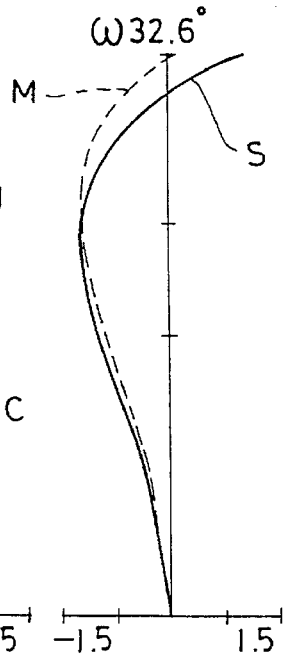
Figure 7C:
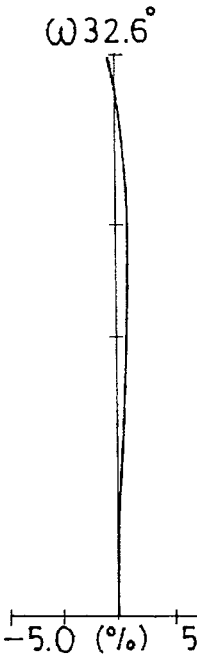
Figure 7D:
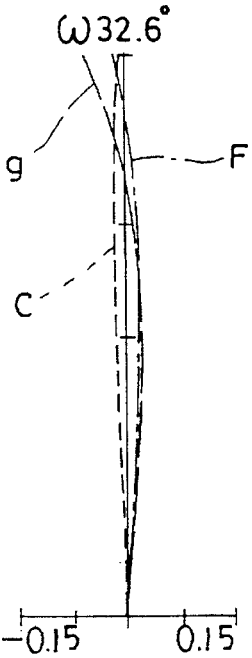

Now, the triplet lens system according to the present invention will be described in more detail below with reference to the preferred embodiments illustrated in the accompanying drawings. Each of these embodiments has a composition illustrated in FIG. 1, wherein the triplet lens system according to the present invention is composed, in order from the object side, of a first positive meniscus lens component $L_1$ having a convex surface on the object side, a second biconcave lens component $L_2$, a third biconvex lens component and a stop.

First through seventh embodiments of the triplet lens system according to the present invention have numerical data listed below:

Embodiment 1 f = 100, F/2.78, 2ω = 64.7°, $f_B$ = 77.835

| | | | |
|---|---|---|---|
| $r_1$ = 32.466 | | | |
| | $d_1$ = 10.85 | $n_1$ = 1.734 | $v_1$ = 51.49 |
| $r_2$ = 74.59 | | | |
| | $d_2$ = 4.82 | | |
| $r_3$ = −86.321 | | | |
| | $d_3$ = 2.34 | $n_2$ = 1.689 | $v_2$ = 31.08 |
| $r_4$ = 34.271 | | | |
| | $d_4$ = 3.58 | | |
| $r_5$ = 90.834 | | | |
| | $d_5$ = 6.81 | $n_3$ = 1.799 | $v_3$ = 42.24 |
| $r_6$ = −60.477 (aspherical surface) | | | |
| | $d_6$ = 3.18 | | |
| $r_7$ = ∞ (stop) | | | | aspherical surface coefficients

E = −0.41866 × $10^{-6}$, F = 0.71905 × $10^{-9}$,
G = −0.6539 × $10^{-11}$
$lx_1/fl$ = 3.26 × $10^{-4}$, $lx_2/fl$ = 1.35 × $10^{-5}$
$f_1/f$ = 0.706, $f_{12}/f$ = −1.279, $r_5/f$ = 0.908

Embodiment 2 f = 100, F/2.84, 2ω = 65.5°, $f_b$ = 78.726

| | | | |
|---|---|---|---|
| $r_1$ = 32.319 | | | |
| | $d_1$ = 11.51 | $n_1$ = 1.734 | $v_1$ = 51.49 |
| $r_2$ = 59.822 | | | |
| | $d_2$ = 4.5 | | |
| $r_3$ = −82.013 | | | |
| | $d_3$ = 2.37 | $n_2$ = 1.688 | $v_2$ = 31.08 |
| $r_4$ = 35.56 | | | |
| | $d_4$ = 3.14 | | |
| $r_5$ = 73.398 (aspherical surface) | | | |
| | $d_5$ = 8.08 | $n_3$ = 1.799 | $v_3$ = 42.24 |
| $r_6$ = −61.14 | | | |
| | $d_6$ = 3.22 | | |
| $r_7$ = ∞ (stop) | | | | aspherical surface coefficients

E = −0.22175 × $10^{-6}$, F = 0.12442 × $10^{-8}$
G = −0.46316 × $10^{-11}$, H = 0.20141 × $10^{-13}$
$lx_1/fl$ = 2.49 × $10^{-5}$, $lx_2/fl$ = 5.1 × $10^{-6}$
$f_1/f$ = 0.814, $f_{12}/f$ = −1.041, $r_5/f$ = 0.734

Embodiment 3 f = 100, F/2.84, 2ω = 65.3°, $f_B$ = 78.03

| | | | |
|---|---|---|---|
| $r_1$ = 33.178 | | | |
| | $d_1$ = 13.42 | $n_1$ = 1.734 | $v_1$ = 51.49 |
| $r_2$ = 59.962 | | | |
| | $d_2$ = 3.6 | | |
| $r_3$ = −74.411 | | | |
| | $d_3$ = 2.36 | $n_2$ = 1.688 | $v_2$ = 31.08 |
| $r_4$ = 38.078 (aspherical surface) | | | |
| | $d_4$ = 3.03 | | |
| $r_5$ = 80.14 | | | |
| | $d_5$ = 6.78 | $n_3$ = 1.799 | $v_3$ = 42.24 |
| $r_6$ = −57.314 | | | |
| | $d_6$ = 3.22 | | |
| $r_7$ = ∞ (stop) | | | | aspherical surface coefficients

E = 0.10605 × $10^{-5}$, F = −0.70622 × $10^{-8}$,
G = 0.27274 × $10^{-10}$, H = −0.51804 × $10^{-13}$
$lx_1/fl$ = 1.33 × $10^{-4}$, $lx_2/fl$ = 2.12 × $10^{-5}$
$f_1/f$ = 0.835, $f_{12}/f$ = −1.065, $r_5/f$ = 0.801

Embodiment 4 f = 100, F/2.8, 2ω = 64.5°, $f_B$ = 74.712

| | | | |
|---|---|---|---|
| $r_1$ = 29.934 | | | |
| | $d_1$ = 10.1 | $n_1$ = 1.734 | $v_1$ = 51.49 |
| $r_2$ = 73 | | | |
| | $d_2$ = 4.66 | | |
| $r_3$ = −127.88 (aspherical surface) | | | |
| | $d_3$ = 2.34 | $n_2$ = 1.688 | $v_2$ = 31.08 |
| $r_4$ = 28.128 | | | |
| | $d_4$ = 3.94 | | |
| $r_5$ = 62.678 | | | |
| | $d_5$ = 9.39 | $n_3$ = 1.799 | $v_3$ = 42.24 |
| $r_6$ = −89.484 | | | |
| | $d_6$ = 3.19 | | |
| $r_7$ = ∞ (stop) | | | | aspherical surface coefficients

E = 0.55462 × $10^{-6}$, F = 0.3249 × $10^{-8}$
G = −0.41347 × $10^{-11}$,
$lx_1/fl$ = 6.14 × $10^{-4}$, $lx_2/fl$ = 2.58 × $10^{-5}$
$f_1/f$ = 0.629, $f_{12}/f$ = −1.409, $r_5/f$ = 0.627

Embodiment 5 f = 100, F/2.85, 2ω = 64.5°, $f_B$ = 75.644

| | | | |
|---|---|---|---|
| $r_1$ = 32.153 | | | |
| | $d_1$ = 11.55 | $n_1$ = 1.734 | $v_1$ = 51.49 |
| $r_2$ = 96.6 | | | |
| | $d_2$ = 3.59 | | |
| $r_3$ = −102.656 (aspherical surface) | | | |
| | $d_3$ = 2.36 | $n_2$ = 1.688 | $v_2$ = 31.08 |
| $r_4$ = 32.546 (aspherical surface) | | | |
| | $d_4$ = 4.13 | | |
| $r_5$ = 92.977 | | | |
| | $d_5$ = 8 | $n_3$ = 1.799 | $v_3$ = 42.24 |
| $r_6$ = −74.638 | | | |
| | $d_6$ = 3.21 | | |
| $r_7$ = ∞ (stop) | | | | aspherical surface coefficients (3rd surface)

E = 0.18226 × $10^{-5}$, F = 0.26221 × $10^{-8}$
G = −0.23485 × $10^{-10}$, H = 0.41565 × $10^{-13}$
$lx_1/fl$ = 8.79 × $10^{-4}$, $lx_2/fl$ = 6.18 × $10^{-5}$ (4th surface)

E = 0.14625 × $10^{-5}$, F = 0.9217 × $10^{-8}$
G = −0.81469 × $10^{-10}$, H = 0.1696 × $10^{-12}$

|x₁/fl| = 5.67 × 10⁻⁴, |x₂/fl| = 4.4 × 10⁻⁵
f₁/f = 0.61, f₁₂/f = −1.891, r₅/f = 0.93

Embodiment 6

F = 100, F/2.85, 2ω= 65.2°, f_B = 78.396

| | | | |
|---|---|---|---|
| r₁ = 32.536 | | | |
| | d₁ = 11.69 | n₁ = 1.734 | ν₁ = 51.49 |
| r₂ = 79.46 | | | |
| | d₂ = 3.42 | | |
| r₃ = −90.735 | | | |
| | d₃ = 2.36 | n₂ = 1.688 | ν₂ = 31.08 |
| r₄ = 33.807 | | | |
| | d₄ = 3.85 | | |
| r₅ = 97.281 (aspherical surface) | | | |
| | d₅ = 6.84 | n₃ = 1.799 | ν₃ = 42.24 |
| r₆ = −61.291 (aspherical surface) | | | |
| | d₆ = 3.21 | | |
| r₇ = ∞ (stop) | | | | aspherical surface coefficients (5th surface)

E = −0.41829 × 10⁻⁶, F = 0.78507 × 10⁻⁸
G = −0.52193 × 10⁻¹⁰, H = 0.16729 × 10⁻¹²
|x₁/fl| = 2.79 × 10⁻⁴, |x₂/fl| = 3.5 × 10⁻⁶
(6th surface)

E = −0.58482 × 10⁻⁶, F = 0.558 × 10⁻⁸
G = −0.50279 × 10⁻¹⁰, H = 0.15504 × 10⁻¹²
|x₁/fl| = 6.26 × 10⁻⁵, |x₂/fl| = 1.24 × 10⁻⁵
f₁/f = 0.679, f₁₂/f = −1.364, r₅/f = 0.973

Embodiment 7 f = 100, F/2.9, 2ω = 63.6°, f_B = 74.975

| | | | |
|---|---|---|---|
| r₁ = 32.152 | | | |
| | d₁ = 11.55 | n₁ = 1.772 | ν₁ = 49.66 |
| r₂ = 117.411 | | | |
| | d₂ = 2.38 | | |
| r₃ = −108.998 (aspherical surface) | | | |
| | d₃ = 2.90 | n₂ = 1.683 | ν₂ = 30.85 |
| r₄ = 32.069 (aspherical surface) | | | |
| | d₄ = 5.24 | | |
| r₅ = 108.582 | | | |
| | d₅ = 7.33 | n₃ = 1.799 | ν₃ = 42.24 |
| r₆ = −86.049 | | | |
| r₇ = ∞ (stop) | | | | aspherical surface coefficients (3rd surface)

E = 0.52883 × 10⁻⁵, F = −0.12305 × 10⁻⁷
G = 0.25421 × 10⁻¹⁰, H = −0.26046 × 10⁻¹³
|x₁/fl| = 1.79 × 10⁻³, |x₂/fl| = 1.49 × 10⁻⁴
(4th surface)

E = 0.48639 × 10⁻⁵, F = −0.36841 × 10⁻⁹
G = −0.37292 × 10⁻¹⁰, H = 0.93997 × 10⁻¹³

|x₁/fl| = 1.50 × 10⁻³, |x₂/fl| = 1.10 × 10⁻⁴
f₁/f = 0.541, f₁₂/f = −3.231, r₅/f = 1.09 wherein the reference symbols $r_1, r_2, \ldots$ represent radii of curvature on surfaces of respective lens components, the reference symbols $d_1, d_2, \ldots$ designate thicknesses of the respective lens components and airspaces reserved therebetween, the reference symbols $n_1, n_2, \ldots$ denote refractive indices of the respective lens components, the reference symbols $\nu_1, \nu_2, \ldots$ represent Abbe's numbers of the respective lens components, and the reference symbol $f_B$ designates a back focal length of the triplet lens system.

Aspherical surfaces which are used in the embodiments of the present invention have shapes expressed by the following formula:

$$x = C y^2 / \{1 + (1 - C^2 y^2)^{1/2}\} + E y^4 + F y^6 + G y^8 + H y^{10}$$

wherein a direction of an optical axis is taken as the x axis, a direction perpendicular to the optical axis is taken as the y axis, the reference symbol C represents curvature as measured at a vertex of an aspherical surface of interest (C=1/r when a paraxial radius of curvature of the aspherical surface is designated by r), or curvature on a reference sphere of the aspherical surface, and the reference symbols E, F, G and H denote aspherical surface coefficients of the fourth, sixth, eighth and tenth orders respectively.

The triplet lens system according to the present invention has a large aperture and high optical performance owing to a fact that an aspherical surface or aspherical surfaces are used as a third surface and/or subsequent surfaces.

I claim:

1. A triplet lens system comprising in order from the object side:

a first positive meniscus lens component having a convex surface on the object side;

a second biconcave lens component;

a third biconvex lens component; and a stop, wherein at least one of said second lens component and said third lens component has an aspherical surface, wherein said triplet lens system satisfies the following conditions (1) and (2);

$$1 \times 10^{-5} < |x_1/f| < 1 \times 10^{-2} \qquad (1)$$

$$0.5 < r_5/f < 1.1 \qquad (2)$$

wherein the reference symbol $x_1$ represents a departure from a reference sphere of at least one of said aspherical surface as measured at a maximum effective diameter thereof, the reference symbol $r_5$ designates a radius of curvature on an object side surface of said third lens component and the reference symbol f denotes a focal length of said triplet lens system as a whole; and said lens system has an F-number significantly less than 3.5.

2. A triplet lens system according to claim 1 further satisfying the following conditions (3) and (4):

$$0.5 < f_1/f < 0.95 \qquad (3)$$

$$-3.5 < f_{12}/f < -0.8 \qquad (4)$$

wherein the reference symbol $f_1$ represents a focal length of said first lens component, and the reference symbol $f_{12}$ designates a total focal length of said first lens component and said second lens component.

3. A triplet lens system according to claim 1 or 2 wherein said aspherical surface satisfies the following condition (5):

$$1\times10^{-6} < |x_2/f| < 1\times10^{-3} \tag{5}$$

wherein the reference symbol $x_2$ represents a departure from the reference sphere of said aspherical surface as measured at a point located at one-half of the maximum effective diameter thereof.

4. A triplet lens system according to claim 1, wherein a thickness on an optical axis of said first lens component is larger than an air space disposed between said second lens component and said third lens component.

* * * * *